June 20, 1961  H. S. V. JARUND  2,989,113
DEVICE FOR MAKING CONTINUOUS OVERLAPPING JOINTS
Filed Oct. 14, 1955  2 Sheets-Sheet 2

Inventor
Harry Sigurd Valdemar Jarund
by Pierce, Scheffler & Parker
attys

United States Patent Office 2,989,113
Patented June 20, 1961

2,989,113
DEVICE FOR MAKING CONTINUOUS OVERLAPPING JOINTS
Harry Sigurd Valdemar Jarund, Lund, Sweden, assignor to Hermorian Ltd., Toronto, Ontario, Canada, a company of Canada
Filed Oct. 14, 1955, Ser. No. 540,579
Claims priority, application Sweden July 8, 1955
5 Claims. (Cl. 154—42)

In the packaging industry it often occurs that different kinds of packages are manufactured by winding or bending a strip or sheet of paper or other packaging material, to a tube or cylinder whereupon the overlapping edges of the sheet are sealed together, forming a continuous longitudinal or a possible helical seam.

In order to perform the sealing, pressure is applied to the joint between two rollers, one on each side of the joint. One of these rollers would suitably act as a pressure roller and the other as counter support roller.

If it is only the question of manufacturing tubes or cylinders, there are little difficulties in guiding the joint between the rollers in such a manner that a twisted and mis-shapen condition of the seam is avoided and practically only rolling friction occurs between the packaging material and the rollers. However, a different problem arises if the tube or cylinder immediately after sealing is to be transformed into a continuous series of packages in the same machine by being pressed together and sealed perpendicularly to the feeding direction of the packaging material. For example, this will be the case in the continuous manufacturing of bags or, in particular, packages of tetrahedron shape.

During the crosswise pressing together, the tube or cylinder will be deformed, and the pressing mechanism throughout its continuous motion will cause a strain on the tube or cylinder after the tube has been completely pressed together. These circumstances will cause small displacements in the position of the overlapping joint between the sealing rollers which, in turn, will lead to a higher friction resistance followed by a higher stress on the tube or cylinder walls.

Apart from the friction loss alone, this increase of friction will cause a serious disadvantage, especially in the manufacturing of tetrahedral packages, performed by the alternate pressing together and sealing of a tube or cylinder in two directions perpendicular to each other. The greater the friction resistance, the greater the tension stresses on the tube or cylinder; this has a tendency to buckle the tube or cylinder inwards in the portion above the center of a transversal section being sealed. When the subsequent perpendicular seal is to be performed, these buckles have appeared to cause W-shaped tucks in the outer edges of the seam, by which it will be impossible to get a tight joint.

The present invention relates to a device comprising two rollers which co-operate as pressure and backing rollers respectively, e.g. for pressing together and sealing the overlapping edges from a band of suitable material, thus forming a continuous tube or cylinder with a longitudinal seam, the pressure roller being secured relatively to the backing roller in such a manner that the working conditions of the rollers in respect to pressure distribution are most advantageous, and that friction resistance along the contact surface of the rollers is reduced to a minimum.

The device, according to the invention, is substantially characterized by the feature that the pressure roller, for its rotation around its own axis, is attached to one end of a shaft member, the other end of which is provided with a universal joint, the shaft member also carrying a supporting roller which is arranged to transmit the working pressure to the pressure roller.

With the device according to this invention, when used for making overlapping joints along a continuous tube or cylinder by means of sealing rollers, the advantage is obtained that the pressure roller, because of the universal mounting described in the preceeding paragraph, automatically adjusts itself and follows any changes of movements and twisting of the seam in its direction of travel, thereby avoiding distortion and high friction resistance.

The invention will be hereinafter described more in detail with reference to the accompanying drawings showing an embodiment of the invention. This is to be considered as an example only.

Figure 1:
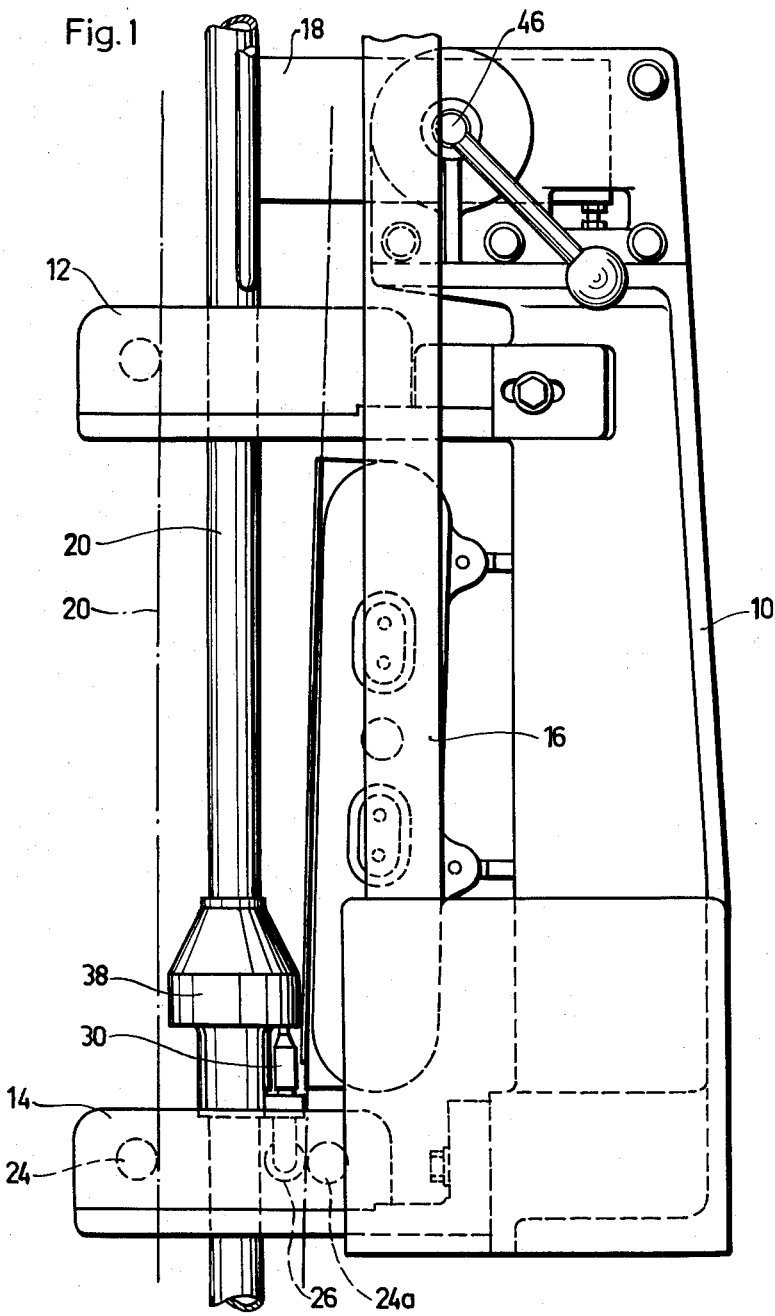
FIG. 1 illustrates a side view of the forming and sealing device of a machine for making tubes or cylinders of sheet or band materials with a longitudinal seam.

In the specific machine illustrated, 10 indicates a part of the machine frame supporting an upper shaping element 12 and a lower shaping element 14. Between these, a heating unit 16 is provided to bring the overlapping edges of thermoplastic sheet material to sealing temperature; also a bracket 18 is attached to frame 10 and holds a feed tube or feed pipe 20 for the supply of pourable material to the packages simultaneously, as they are made. 22 represents the sheet of packaging material, shown in FIG. 1 by dash-dotted lines and in FIGS. 2 and 3 by solid lines.

In order to reduce the friction between the packaging 22 and the shaping elements 12 and 14, the members 12 and 14 are provided with a ring of concave rollers 24 contacting the outside of the tube or cylinder that is being formed. The ring of concave rollers 24 is more particularly disclosed and claimed in applicant's copending application Serial No. 263,358 filed December 26, 1951, now U.S. Patent No. 2,832,271 issued April 29, 1958. One of these concave rollers 24 of the lower forming member 14, which is indicated by 24a on the drawings, also serves as a backing roller in the process of pressing and sealing the longitudinal seams together.

Figure 2:
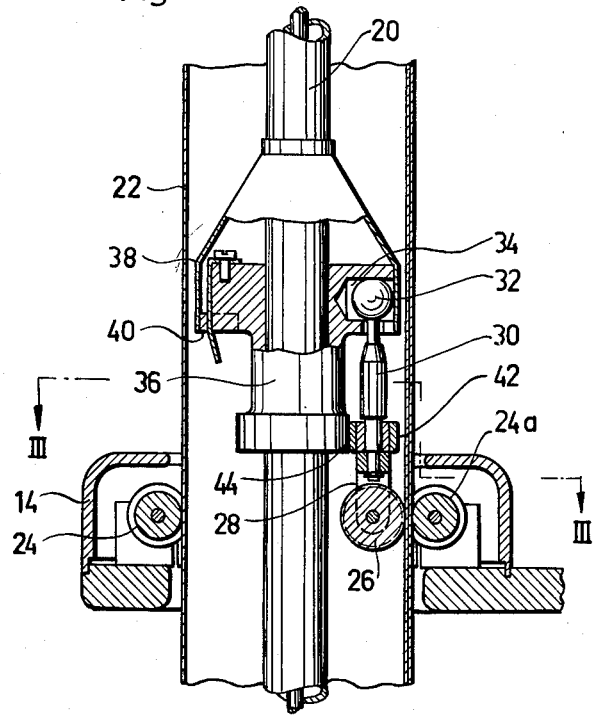
FIG. 2 illustrates on a larger scale and partly in section, the device for pressing the longitudinal seam together.
Figure 3:
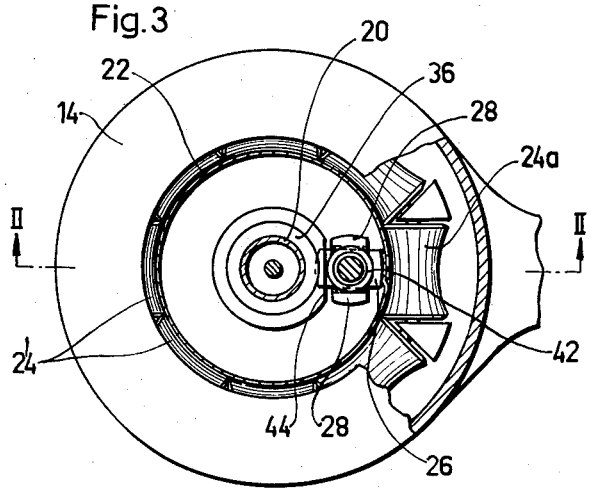
FIG. 3 shows section III—III of FIG. 2.

A pressure roller 26 is working in conjunction with the backing roller 24a and is carried by the lower forked end 28 of a shaft member 30. The upper end of shaft member 30 is journalled by means of a universal joint in a socket 34 in a housing 36 on feed pipe 20. The universal joint, in this case, consists of a ball joint 32 (FIG. 2).

In order to close in and protect socket 34 with its ball joint 32, the whole housing 36 is enclosed by a cover 38, which can be moved along and turned around pipe 20. In the operating position cover 38 is locked to housing 36 by means of a bayonet fixing 40 or similar locking device.

Member 30 is also carrying a supporting roller bearing 42, which is able to rotate around the longitudinal axis of member 30, and is made to roll against a cam or guide surface 44 of housing 36. According to the illustrated embodiment, this cam or guide surface is flat and parallel to the axis of backing roller 24a, but in order to obtain certain purposes it can also have other shapes and forms.

Bracket 18 is at one end rigidly connected to supply pipe 20 and situated on the same side as pressure roller 26 and above the upper shaping element 12, according to the described embodiment. Furthermore, bracket 18 is pivoted in a vertical plane and carried by a pivot support 46 situated some distance away from supply pipe 20. If a force is applied to bracket 18 and so directed that it tends to move the end of the bracket downward which is connected to pipe 20, this force will be transmitted to pressure roller 26 by supply pipe 20, housing 36, counter supporting roller 42 and shaft member 30, and will cause a corresponding contact pressure between the two rollers 26 and 24a. In this manner, the natural resilience and spring stresses of the supply pipe 20 are utilized in order to get proper contact between the sealing rollers 26 and 24a. No further efforts or arrangements are thus necessary for obtaining a resilient contact compression between the rollers.

I claim:

1. Apparatus for pressing together and sealing a longitudinal overlapping seam comprising a backing roller disposed at one side of the seam, a pressure roller disposed opposite said backing roller at the opposite side of the seam, means mounting said backing roller for rotation about its axis and means mounting said pressure roller for rotation about its axis, said mounting means for said pressure roller comprising a shaft to one end of which said pressure roller is journalled for rotation about an axis transverse to the longitudinal axis of said shaft, said shaft extending longitudinally of the seam, a support for said shaft, a universal joint connecting the other end of said shaft with said support, a roller journalled on said shaft for rotation about the longitudinal axis of said shaft, and a pressure member engageable with said roller journalled on said shaft for transmitting a sealing pressure via said shaft to said pressure roller.

2. Apparatus for pressing together and sealing a longitudinal overlapping seam in the production of a continuous tube formed from a continuous band of material comprising a support member extending longitudinally within the tube, a housing surrounding and secured to said support member, a shaft member extending longitudinally within the tube, a pressure roller mounted at one end of said shaft member for rotation about an axis transverse to the longitudinal axis of said shaft member and establishing a rolling contact longitudinally along one side of the seam, a universal joint mounting the other end of said shaft member on said housing, a supporting roller mounted on said shaft member between said pressure roller and universal joint for rotation about the longitudinal axis of said shaft member, said housing including a transverse guide surface upon which said supporting roller can roll, and a backing roller located opposite said pressure roller at the other side of the seam, the pressure to said pressure roller being applied from said support member through said housing, guide surface, supporting roller and shaft member.

3. Apparatus as defined in claim 2 wherein said universal joint consists of a ball joint arranged in a socket in said housing.

4. Apparatus as defined in claim 3 and which further includes a cover member enclosing said socket and ball joint.

5. Apparatus as defined in claim 4 and which further includes means attaching said cover member to said housing.

References Cited in the file of this patent

UNITED STATES PATENTS

| | | |
|---|---|---|
| 709,864 | Boenning | Sept. 30, 1902 |
| 2,227,497 | Hallman | Jan. 7, 1941 |
| 2,424,558 | Delano | July 29, 1947 |
| 2,637,056 | Morain | May 5, 1953 |
| 2,660,219 | Haas et al. | Nov. 24, 1953 |
| 2,675,054 | Langer | Apr. 13, 1954 |

FOREIGN PATENTS

| | | |
|---|---|---|
| 691,649 | Great Britain | May 20, 1953 |